United States Patent [19]

Rondas

[11] 3,951,305
[45] Apr. 20, 1976

[54] MAGNETIC FEEDER AND METHOD OF FEEDING MAGNETIC PARTS

[75] Inventor: Ivan V. Rondas, Mission Viejo, Calif.

[73] Assignee: GTI Corporation, Pittsburgh, Pa.

[22] Filed: Oct. 25, 1974

[21] Appl. No.: 517,907

[52] U.S. Cl. ............................... 221/212; 198/41
[51] Int. Cl.² ......................................... B65G 47/12
[58] Field of Search ...................... 198/41; 221/212

[56] References Cited
UNITED STATES PATENTS

| | | | |
|---|---|---|---|
| 3,118,564 | 1/1964 | Vokes | 221/212 X |
| 3,164,081 | 1/1965 | Vincze | 198/41 X |
| 3,164,269 | 1/1965 | Roosevelt | 198/41 X |
| 3,388,795 | 6/1968 | Beroset et al. | 221/212 X |
| 3,741,436 | 6/1973 | Hartline et al. | 221/212 |

Primary Examiner—Allen N. Knowles
Assistant Examiner—Hadd Lane
Attorney, Agent, or Firm—George F. Smyth

[57] ABSTRACT

A feeder for magnetic components comprising a hopper adapted to receive the components, first and second magnets mounted for pivotal movement about first and second pivot axes, respectively, and a mechanism for oscillating the magnets. The hopper has an outlet and the oscillation of the magnets moves the magnetic components in the hopper toward the outlet. A pickup wheel is provided at the outlet for removing the components from the hopper.

11 Claims, 14 Drawing Figures

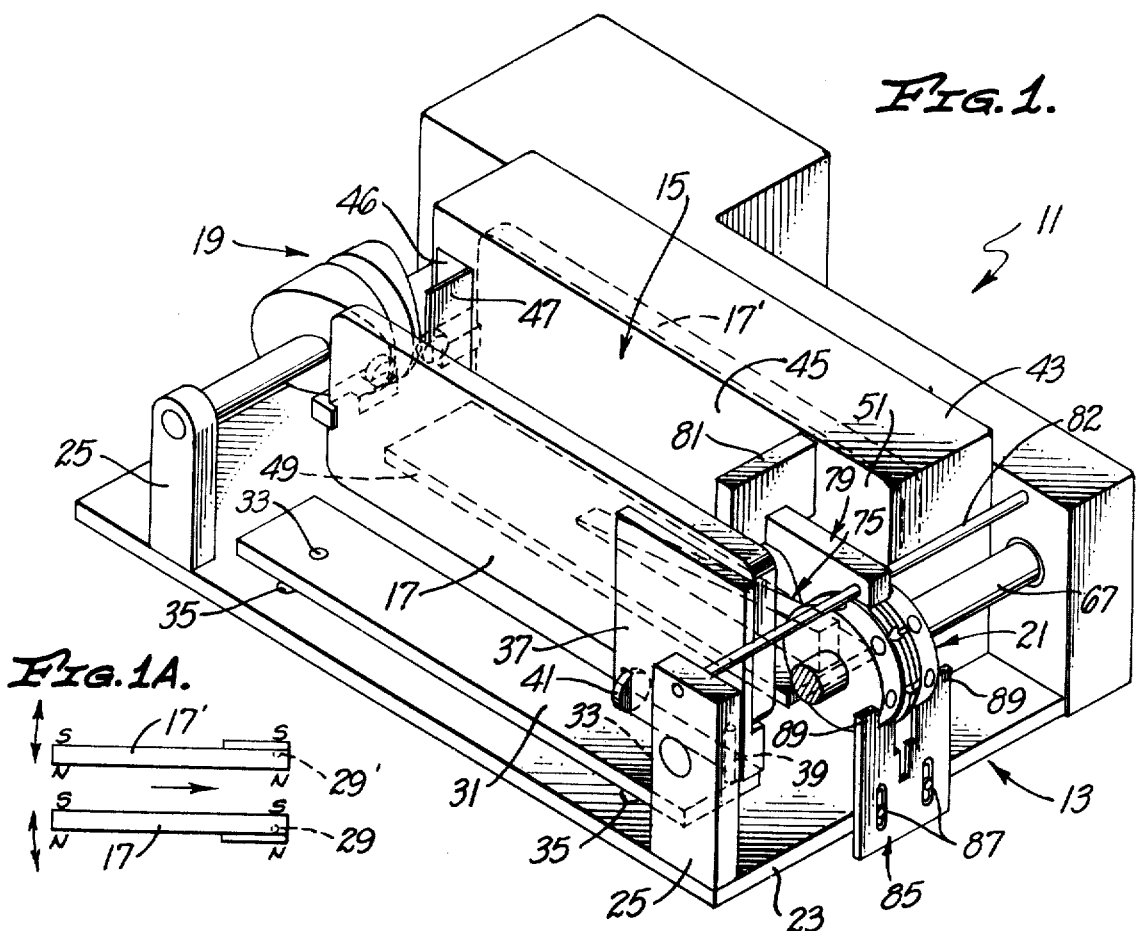
Fig. 1.
Fig. 1A.
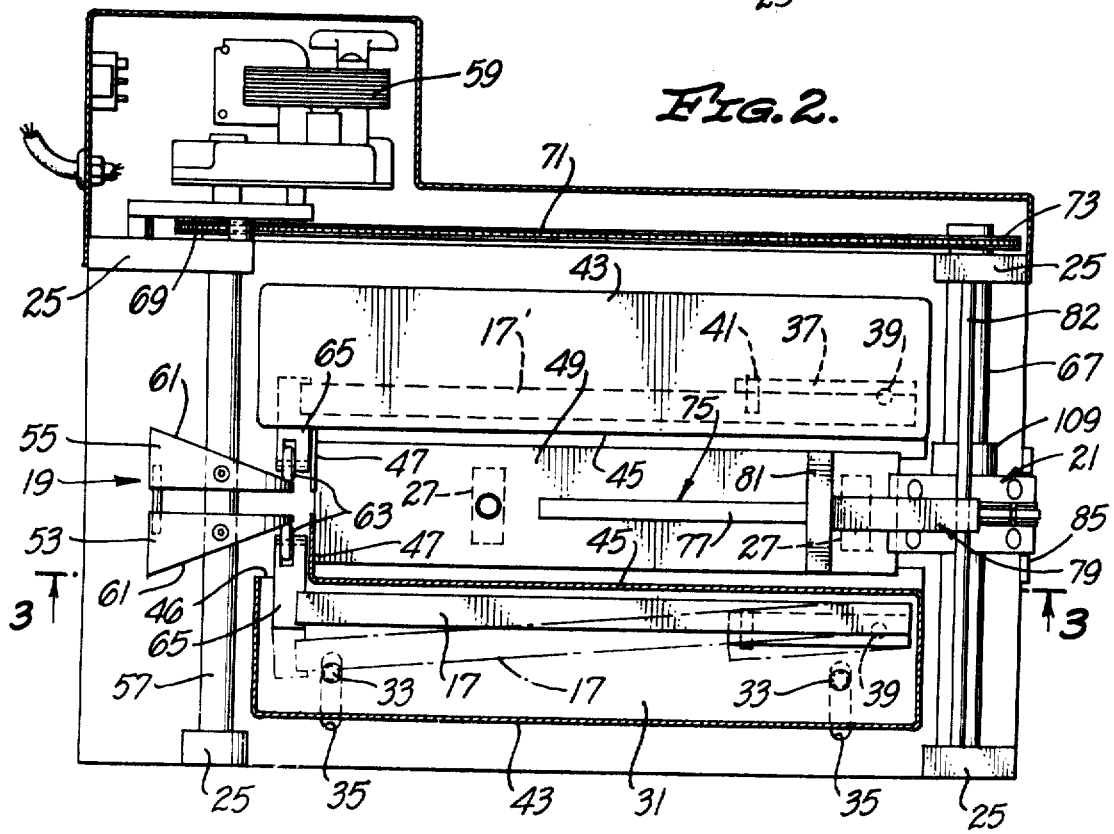
Fig. 2.

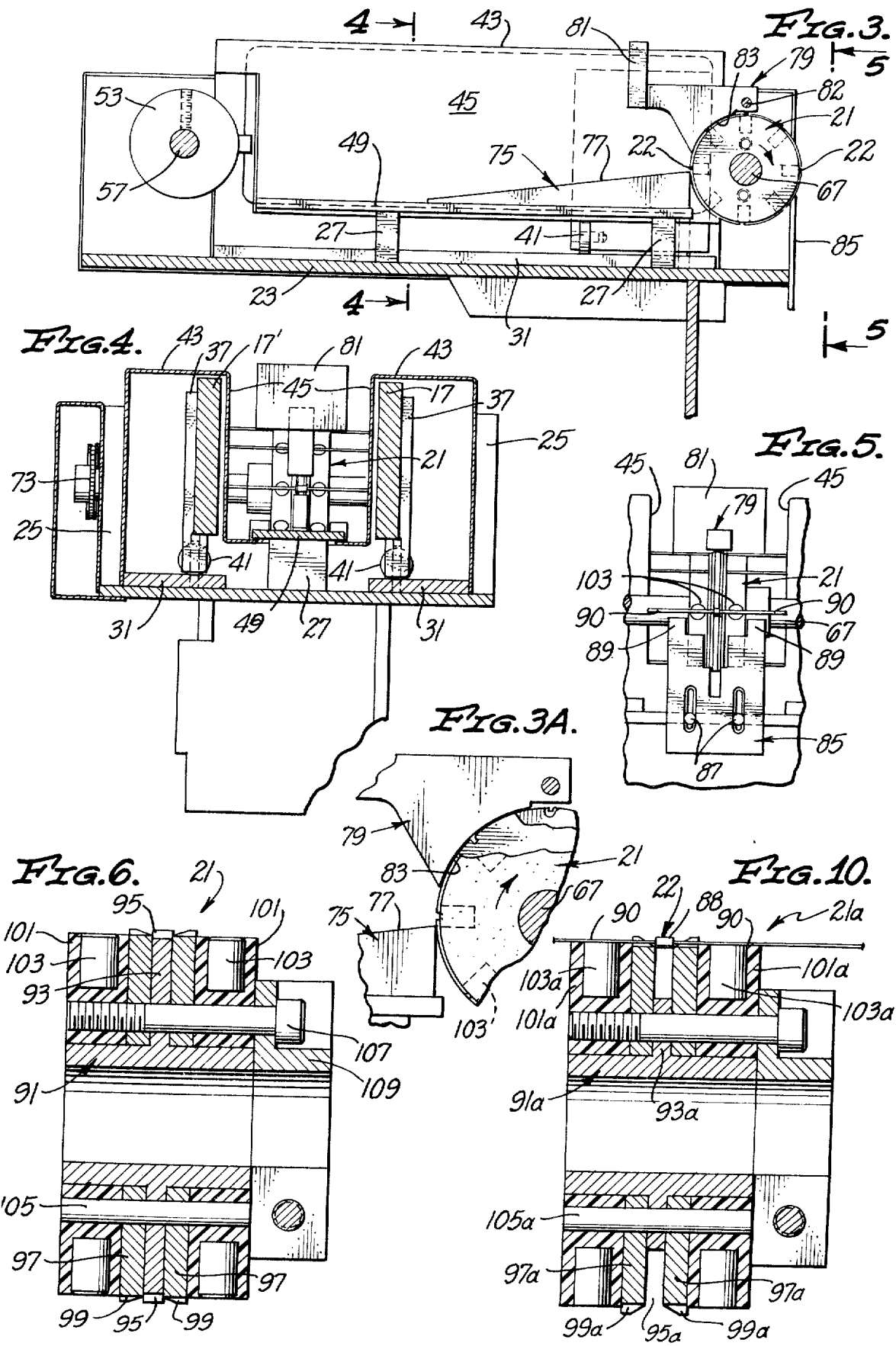

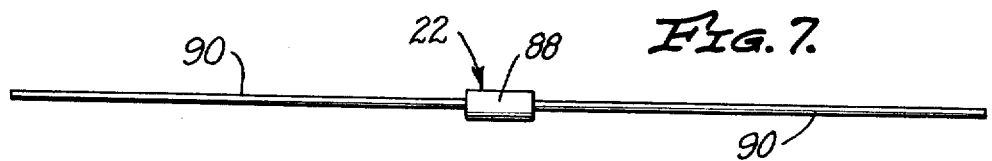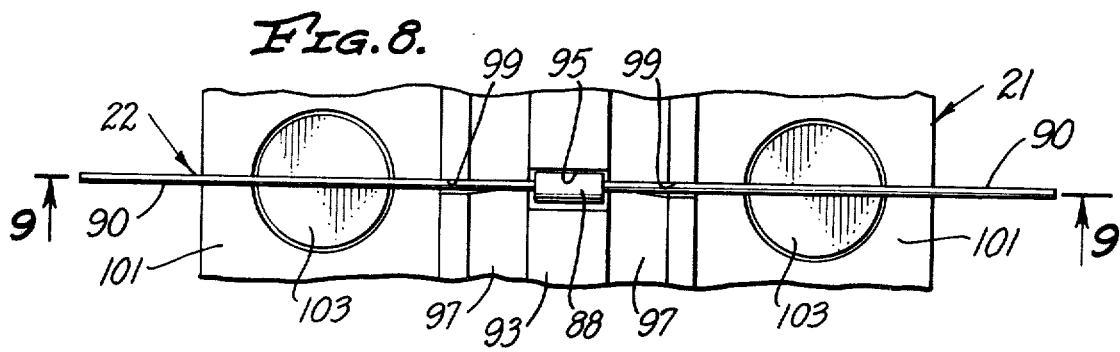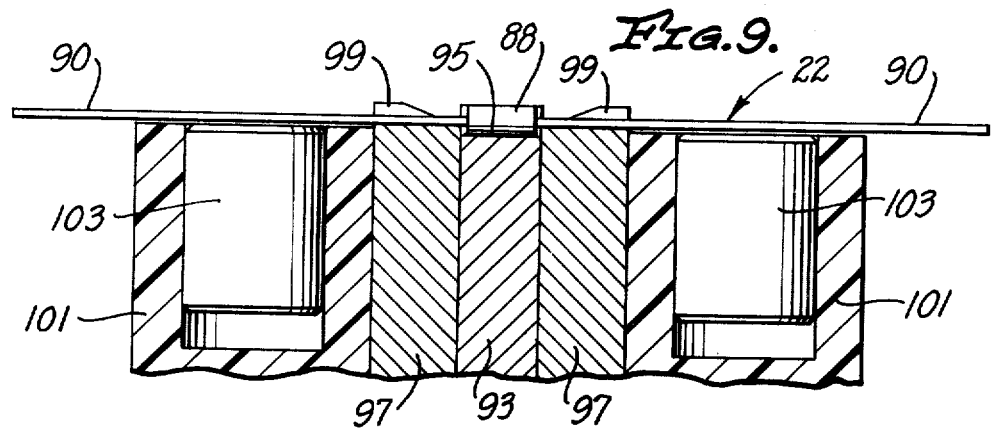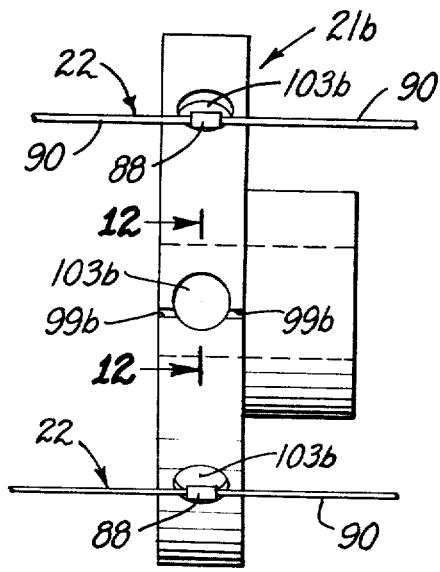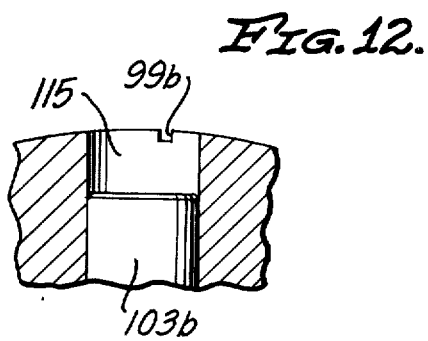

MAGNETIC FEEDER AND METHOD OF FEEDING MAGNETIC PARTS

BACKGROUND OF THE INVENTION

Magnetic feeders are used for feeding various magnetic components such as electrical and electronic components. For example, a magnetic feeder may be used to feed diodes or resistors to appropriate equipment for testing and/or marking. Of course, for a component to be fed, it must be magnetic, i.e. include magnetic material. For example, in the case of diodes, the leads are typically constructed at least in part of ferromagnetic material.

In a typical prior art magnetic feeder, the components are magnetically suspended and then nonmagnetically moved. For example, in the device shown in U.S. Pat. No. 3,702,438, the components are moved by gravity. Similarly, in the feeder shown in U.S. Pat. No. 3,120,890, the components are moved by gravity after the magnetic suspending force on the components is removed.

In the prior art magnetic feeder shown in British Pat. No. 1,141,753, the components are moved by a vibrating table and by reversing the direction of current in control coils. The vibrating table increases the cost and complexity of this feeder. In addition, the current reversal, particularly when coupled with the action of the vibrating table, would not result in smoothly moving the components.

All of the above-noted prior art magnetic feeders have a common problem. Although a magnetic feeder is adapted to magnetically suspend the magnetic components in generally parallel relationship, inherently some of the components become disoriented and nonparallel relative to the other parts. For example, when diodes are fed, the leads of some of them may assume a crisscross relationship. Prior art devices have no special ability to resolve this problem.

SUMMARY OF THE INVENTION

The present invention provides a magnetic feeder which magnetically suspends and smoothly magnetically moves magnetic parts. Neither a vibrating table nor gravity are required for part movement. Although the feeder can be used with various parts, it is particularly adapted for use with electrical components.

One feature of this invention is that the magnetic field can be varied so as to cause the components to flow back and forth toward an outlet. This keeps a supply of components at the outlet and the back and forth motion tends to realign nonparallel or otherwise disoriented parts. This motion of the components can be obtained by appropriately moving the magnets.

These features can be embodied in a magnetic feeder which includes a chute or hopper and first and second magnets. The hopper may include, for example, a bottom wall and first and second side walls. The hopper has an outlet which is preferably located adjacent one end of the chute and preferably centered in the flux field of the magnets. The first and second magnets are mounted outside of the first and second side walls, respectively. By constructing the side walls of nonmagnetic material a barrier is provided which prevents the components from sticking directly to the surface of the magnets.

At least one of the magnets is mounted for pivotal movement about a pivot axis. Means are provided for oscillating the pivotally mounted magnet about its pivot axis to move the magnet toward and away from the adjacent side wall. Means are provided for removing the components at the outlet.

With this construction, magnetic components can be bulk deposited in the hopper and the magnetic forces are such as to magnetically suspend the components. The magnets are constructed and arranged so that the oscillatory movement of the magnet alters the flux field to produce the back and forth motion of the components described above.

Either or both of the magnets may be mounted for pivotal movement, and more than two magnets may be provided if desired. Broadly, any type of magnet motion, either linear or arcuate, which will result in magnetically moving the components toward the outlet may be provided. However, magnet motion of the type which will produce a back and forth movement of the components toward and away from the outlet is preferred in order to tend to maintain proper component orientation. If the chute is in a horizontal position, the movement of the components in the chute is primarily horizontal.

Although the magnets can be mounted for different kinds of movement, oscillatory motion toward and away from each other is preferred. This reduces and increases the gauss density affect on components suspended in this magnetic field. As the gauss density is reduced, components or any ferromagnetic material suspended in this field will immediately tend to move and seek a higher density section of this field. To permit the feeder to accommodate components of maximum length, the magnets are preferably generally parallel in their closest together position. In a preferred construction, the pivot axes of the two magnets are vertical and are located directly opposite to each other on opposite sides of the hopper. With this construction, both of the magnets can be moved simultaneously away from each other and then simultaneously toward each other.

The magnets can be oscillated about their pivot axes in different ways. In a preferred construction, the magnets are cammed in one direction and the force of attraction between the magnets moves them in the opposite direction about their pivot axes.

The means for removing components at the outlet can advantageously take the form of a pickup wheel. The pickup wheel may include a rotatable member and at least one magnet carried by the rotatable member. The magnet is sufficiently strong to withdraw a component from the supply of components magnetically suspended at the outlet of the chute. The component removed by the pickup wheel is then carried to a removal station where it is stripped from the influence of this stronger magnet and the pickup wheel.

If the components fed by the feeder are, for example, diodes having a body or head and a pair of leads, the pickup wheel preferably has a first groove for receiving the body and a pair of adjacent grooves for receiving the leads. These grooves properly orient the component on the pickup wheel and are preferably sufficiently wide to accept only one component. In one construction, the pickup wheel includes a plurality of wheel sections, one of which has the groove for receiving the body of the component. The pickup wheel can be adapted for use with components of different sizes by replacing the wheel section having the body receiving groove.

To facilitate loading of components on the pickup wheel as the wheel rotates, a ramp is provided on the bottom of the hopper. The ramp is inclined upwardly as it extends toward the outlet. In addition, the ramp prevents the components at the outlet from resting below the influencing stronger magnets of the pickup wheel.

The invention can best be understood by reference to the following description taken in connection with the accompanying illustrative drawings.

BRIEF DESCRIPTION OF THE DRAWINGS

FIG. 1 is a cutaway isometric view of a magnetic feeder constructed in accordance with the teachings of this invention.

FIG. 1A is a diagrammatic plan view illustrating one way in which the magnets can be oscillated.

FIG. 2 is a plan view partially in section of the magnetic feeder.

FIG. 3 is a sectional view taken generally along line 3—3 of FIG. 2.

FIG. 3A is an enlarged fragmentary view of the feeder adjacent the pickup station.

FIG. 4 is a sectional view taken generally along line 4—4 of FIG. 3.

FIG. 5 is a fragmentary end elevational view taken generally along line 5—5 of FIG. 3.

FIG. 6 is a sectional view illustrating one form of pickup wheel.

FIG. 7 is an elevational view of one example of a component which can be fed with the feeder of this invention.

FIG. 8 is an enlarged fragmentary plan view showing how a component is retained by the pickup wheel.

FIG. 9 is a sectional view taken generally along line 9—9 of FIG. 8.

FIG. 10 is a sectional view illustrating a second form of pickup wheel.

FIG. 11 is a plan view illustrating a third form of pickup wheel.

FIG. 12 is an enlarged, fragmentary sectional view taken generally along line 12—12 of FIG. 11.

DESCRIPTION OF THE PREFERRED EMBODIMENTS

FIG. 1 shows a magnetic feeder 11 which generally includes a supporting structure 13, a hopper 15 mounted on the supporting structure, a pair of magnets 17 and 17', cam means 19 for urging the magnets apart, and a rotatable pickup wheel 21. The hopper is adapted to receive components 22. The supporting structure 13 may be of any construction which will perform the necessary supporting functions. In the embodiment illustrated, it includes a base plate 23, four corner blocks 25 FIGS. 1 and 2) attached to the base plate, and two support blocks 27 (FIGS. 2 and 3).

Each of the magnets 17 and 17' is a permanent magnet and may be arranged for oscillatory motion about vertical pivot axes 29 and 29', respectively, as shown by way of example in FIG. 1A. The confronting sides of the magnets 17 and 17' are of opposite polarity so that the magnets tend to attract each other.

The magnets 17 and 17' are identical and may be mounted in an identical manner, for example, as shown in FIGS. 1–4. A mounting plate 31 for each of the magnets is mounted on the base plate 23 in any suitable manner such as by screws 33 which project through slots 35 in the base plate. Each of the magnets 17 and 17' is affixed to a mounting member 37 which is pivotally mounted by a pin 39 on the associated mounting plate 31. A roller 41 is carried by each of the mounting members 37 and rolls along the associated mounting plate 31. The pivot axes 29 and 29' (FIG. 1A) are defined by the longitudinal axes of the pins 39, respectively. The screws 33 and the slots 35 permit adjustment in the location of the mounting plates 31 toward and away from each other. By moving the mounting plates 31, the magnets 17 and 17' can be moved toward and away from each other.

Each of the magnets 17 and 17' is substantially housed by wall means or a housing 43. Each of the housings 43 is constructed of nonmagnetic material and forms a downwardly opening box as best seen in FIGS. 2 and 4. Each of the housings 43 has an inner side wall 45, and in the embodiment illustrated, these side walls are parallel. Each of the side walls 45 has an opening 46 (FIGS. 1 and 2) and perpendicular flanges 47 formed integrally with the side walls inwardly of the openings 46.

The hopper 15 includes the side walls 45, the flanges 47, and a bottom wall 49 mounted on the blocks 27. The end of the hopper 15 opposite the flanges 47 is open to define an outlet 51. In the embodiment illustrated, the bottom wall 49 is horizontal and the side walls 45 and the flanges 47 are vertical.

The cam means 19 oscillates the magnets 17 and 17'. In the embodiment illustrated, the cam means 19 includes cams 53 and 55 (FIG. 2) affixed to each other and to a shaft 57. The shaft 57 is suitably rotatably mounted in bearings (not shown) carried by an opposite pair of the corner blocks 25. The shaft 57 is driven by any suitable electric motor 59.

Each of the cams 53 and 55 has a cam surface 61. Cam follower rolls 63 are carried by arms 65 which are attached to the magnets 17 and 17', respectively. The arms 65 project through the openings 46, respectively. The cam surfaces 61 are arranged so that as the cams 53 and 55 rotate, the ends of the magnets 17 and 17' remote from the pins 39 are cammed apart simultaneously. The force of attraction between the magnets 17 and 17' holds the cam follower rolls 63 against the associated cam surface 61. The force of attraction between the magnets 17 and 17' also draws the magnets simultaneously toward each other as permitted by the cam surfaces 61.

In the embodiment illustrated, the magnets 17 and 17' oscillate in synchronism, i.e., each of the magnets 17 and 17' moves outwardly together and inwardly together. The closest together position of the magnets 17 and 17' is the parallel position. The length of the stroke of oscillation can be varied by those skilled in the art and is the same for both magnets in the embodiment illustrated. Preferably the magnets are not moved apart so far that the components 22 suspended in the hopper 15 lose their magnetic suspension. Similarly, the frequency of oscillation can be selected by those skilled in the art.

The pickup wheel 21 is mounted on a shaft 67 for rotation with the shaft. The shaft 67 is in turn mounted within bearings (not shown) retained in an opposed pair of the corner blocks 25. The shaft 67 is driven by the motor 59 through a suitable drive train such as a sprocket 69 (FIG. 2) mounted on the shaft 57, a chain 71, and a sprocket 73 mounted on the shaft 67. This causes the pickup wheel 21 to be rotated in synchronism with the cam means 19.

The pickup wheel 21 is of generally cylindrical configuration and is located at the outlet 51 with a portion of the pickup wheel projecting into the hopper as shown in FIGS. 1–3. A ramp 75 is mounted on the bottom wall 49. The ramp 75 has a ramp surface 77 which extends upwardly from a location adjacent the bottom wall 49 to a location just beneath a horizontal plane which includes the axis of the shaft 67. The ramp surface 77 also terminates closely adjacent the pickup wheel 21. A primary stripper 79 is attached by a block 81 and suspended above the pickup wheel 21 by means of a shaft 82. The primary stripper 79 has a curved surface 83 which confronts and lies closely adjacent a region of the periphery of the pickup wheel 21.

The function of the pickup wheel 21 is to pick up individual components 22 at a pickup station. The pickup station is immediately avove the ramp 75 and adjacent the pickup wheel 21. At the pickup station the components 22 are individually picked from the supply of components magnetically suspended near the outlet 51.

In the embodiment illustrated, the removal station is spaced approximately 180° from the pickup station. At the removal station, a secondary stripper 85 (FIGS. 1, 3 and 5) removes the components from the pickup wheel 21. In the embodiment illustrated, the secondary stripper 85 is mounted on the base plate 23 by screws 87 which extend through slots in the stripper. The secondary stripper 85 has a pair of arms 89 for removing the components from the pickup wheel 21 at the removal station.

The pickup wheel 21 can be of various different designs. In the form shown in FIG. 6, the pickup wheel 21 is a body pickup wheel. This form of pickup wheel is particularly adapted for use with a component having a strong body but weak or flexible leads. The pickup wheel 21 shown in FIG. 6 includes a central hub 91 having an integral disc 93 which defines a plurality of circumferentially spaced body receiving grooves 95. A pair of lead retainer rings 97 are mounted on the hub on opposite sides of the disc 93. Each of the lead retainer rings 97 has a plurality of outwardly opening lead receiving grooves 99 axially aligned with one of the body receiving grooves 95.

A pair of magnet wheels 101 are mounted on the hub 91 confronting the outer faces of the lead retainer rings 97, respectively. The magnet wheels 101 are constructed of nonmagnetic material. Each of the magnet wheels 101 carries a plurality of circumferentially spaced magnets 103. The outer surface of each of the magnets 103 is of a polarity which is opposite to the polarity of the inner surface of the adjacent magnet 17 or 17'. One of the magnets 103 carried by each of the magnet wheels 101 is axially aligned with an associated pair of lead receiving grooves 99. An axially aligned pair of magnets 103, pair of grooves 99, and a groove 95 define a pickup location. A dowel pin 105 maintains proper alignment between the various sections of the pickup wheel 21 and a screw 107 holds the sections of the pickup wheel 21 together and mounts the pickup wheel on a driver 109. The driver 109 is adapted for attachment to the shaft 67.

FIG. 7 shows one of the components 22 which is merely one example of a component which is adapted to be fed by the magnetic feeder 11. The component 22 is a diode and includes a body 88 and a pair of conductive leads 90. The leads 90 include at least some ferromagnetic material. Obviously, other kinds of components could be fed with the magnetic feeder 11.

FIGS. 8 and 9 show how the pickup wheel 21 carries one of the components 22. FIG. 8 shows that one pair of the magnets 103, one pair of the lead receiving grooves 99 and one of the body receiving grooves 95 are in axial alignment. The components 22 extend axially of the pickup wheel 21.

FIG. 9 shows on a larger scale how the body 88 is supported by the body receiving groove 95. Specifically, the body 88 rests on the inner surface of the body receiving groove 95 and the leads 90 are spaced radially outwardly from the magnets 103 so that there is a radial clearance space between each of the leads 90 and the associated magnet 103.

In use of the magnetic feeder 11, a number of the components 22 are deposited in the hopper 15. The magnetic field created by the magnets 17 and 17' magnetically suspends these components with the long axes of the components extending in a direction generally perpendicular to the side walls 45. The components 22 are suspended in mid-air, and because the side walls 45 are constructed of nonmagnetic material, the components will not cling to the side walls. Because the components 22 are magnetically suspended, the bottom wall 49 is not ordinarily required for supporting components within the hopper 15 unless a very large number of components are deposited in the hopper.

To move the components 22 in the hopper 15 generally toward the outlet 51, the motor 59 is energized to rotate the shaft 57 and the cams 53 and 55. The cams 53 and 55 simultaneously urge the magnets 17 and 17', respectively, outwardly away from each other about the pins 39 on the outward stroke. As the ends of the magnets 17 and 17' remote from the pins 39 move apart, the magnetic field adjacent the flanges 47 is reduced while the magnetic field adjacent the outlet 51 is maintained substantially constant. The stronger magnetic field at the outlet 51 tends to draw the components 22 forwardly toward the outlet.

The force of attraction between the magnets simultaneously draws the magnets toward each other on the inward stroke as permitted by the cam surfaces 61. As the magnets 17 and 17' move toward each other, the strength of the field adjacent the flanges 47 is restored and this tends to pull some of the components rearwardly toward the flanges 47. Thus, oscillation of the magnets 17 and 17' sets up a limited back and forth motion of the components 22 along a generally horizontal path. The forward movement generally exceeds the rearward movement so that the hopper 15 can be progressively emptied.

Inherently some of the components 22 within the hopper 15 will become nonparallel and the leads 90 may become crossed. The back and forth motion of the components 22 resulting from oscillation of the magnets 17 and 17' tends to orient all of the components 22 in a generally parallel relationship as components 22 reach the area of the pickup wheel 21.

The magnets 103 have sufficient strength to withdraw a magnetically suspended component 22 at the pickup station from the field of the magnets 17 and 17'. The ramp 75 and the curved surface 83 of the primary stripper 79 mask off a large segment of the periphery of the pickup wheel 21 so that only one pickup location is exposed there-between at any one time. This reduces the number of the components 22 exposed to pickup wheel 21 for removal from the hopper area.

The component 22 picked up by the pickup wheel 21 is carried to the removal station where the arms 89 of the secondary stripper 85 engage the leads 90 to remove the component from the pickup wheel. After the component 22 is removed from the pickup wheel 21, it may be further conveyed or processed in any suitable manner. For example, it may be fed to a component printer or to a tester which will perform electrical tests on the component. To adapt the pickup wheel 21 for components of different sizes, it is only necessary to remove the screw 107 and replace the hub 91 with another hub having body receiving grooves 95 of a different size.

FIG. 10 shows a pickup wheel 21a which is identical to the pickup wheel 21 except as noted herein. Portions of the pickup wheel 21a corresponding to portions of the pickup wheel 21 are designated by corresponding reference numerals followed by the letter a.

The pickup wheel 21a has a disc 93a which is radially shorter than the disc 93. Consequently, the body receiving groove 95a is of much greater radial depth than the body receiving groove 95. The leads 90 of the components 22 rest on the magnets 103a and the body 88 does not bottom out in the body receiving groove 95a. Moreover, in lieu of providing a plurality of body receiving grooves such as the grooves 95, only one of the grooves 95a is provided and this is in the form of an annular gap between the lead retaining rings 97a.

The pickup wheel 21a serves as a lead pickup wheel in that the orientation of the components 22 picked up by the wheel is established by the lead receiving grooves 99a. In all other respects, the construction and operation of the pickup wheel 21a is identical to the pickup wheel 21.

FIG. 11 shows a pickup wheel 21b which differs from the pickup wheels 21 and 21a. The pickup wheel 21b carries a plurality of magnets 103b recessed in radially extending and radially opening bores 115. The pickup wheel 21b is integrally contructed except for the magnets 103b. Two axially aligned lead receiving grooves 99b are formed for each of the bores 115 by cutting away material between the interior of the bores and the end faces of the pickup wheel. The portion of the bore 115 above the magnet 103b forms a body receiving groove for receiving the head 88 of the component 22. The pair of lead receiving grooves 99b for each of the bores 115 do not extend diametrically across the bore 115. One reason for this is to provide a narrower region of the bore for the body 88 to thereby assure that the body will be more snugly retained by the pickup wheel.

Although exemplary embodiments of the invention have been shown and described, many changes, modifications and substitutions may be made by those with ordinary skill in the art without necessarily departing from the spirit and acope of this invention.

I claim:

1. A feeder for magnetic components comprising:
a hopper adapted to receive the components including a bottom wall and first and second side walls, each of said first and second side walls having an inner surface, said hopper having first and second opposite ends and an outlet adjacent said first end of the hopper;
first and second magnets;
first means for mounting said first magnet outside of the inner face of said first side wall for pivotal movement about a first pivot axis;
second means for mounting said second magnet outside of the inner surface of said second side wall;
means for oscillating said first magnet about said first pivot axis to move the first magnet relative to the inner surface of said first side wall;
said magnets cooperating to orient the components in the chute and the oscillatory movement of said first magnet at least assisting the movement of the components toward said outlet; and
means for removing the component at said outlet.

2. A feeder as defined in claim 1 wherein said first pivot axis is closer to said outlet than said second end.

3. A feeder as defined in claim 1 wherein said second means mounts said second magnet for pivotal movement about a second pivot axis and said oscillating means oscillates said second magnet about said second pivot axis to move the second magnet relative to the inner surface of said second side wall, said first and second pivot axes being located generally directly opposite each other.

4. A feeder as defined in claim 1 wherein said oscillating means includes a rotatable cam and a cam follower carried by said first magnet and engageable with said cam.

5. A feeder as defined in claim 1 wherein said first pivot axis is nonhorizontal and said first magnet oscillates about the first pivot axis to move the first magnet toward and away from the inner surface of said first side wall.

6. A feeder as defined in claim 5 wherein said oscillating means includes the magnetic forces between said magnets, said magnetic forces pivoting said first magnet in one direction about said first pivot axis.

7. A feeder as defined in claim 1 wherein said removing means includes a wheel, means for rotatably mounting said wheel adjacent said outlet, and a magnet carried by said wheel, said magnet being of sufficient strength to withdraw at least one of the components from the hopper.

8. A feeder as defined in claim 1 wherein said bottom wall is generally horizontal and said first pivot axis is generally vertical.

9. A feeder for magnetic components comprising:
first and second magnets;
first means for mounting said first magnet for pivotal movement about a first pivot axis;
second means for mounting said second magnet for pivotal movement about a second pivot axis, said pivot axes being generally parallel;
first wall means for at least partially enclosing said first magnet;
second wall means for at least partially enclosing said second magnet;
rotatable cam means for urging said magnets apart to pivot said magnets in one direction about their respective pivot axes;
said magnets being arranged to attract each other and the force of attraction between the magnets urging said magnets toward each other to pivot said magnets in the other direction about their respective pivot axes;
said feeder having an outlet at least partially between said first and second wall means;
a pickup wheel adjacent said outlet including a rotatable member and a magnet carried by the rotatable member; and
means for mounting the pickup wheel for rotation.

10. A feeder as defined in claim 9 wherein each of said wall means has an opening remote from the pivot axis of the associated magnet, said cam means including first and second cam surfaces and means extending through each of said opening means for drivingly connecting each of said cam surfaces to the associated magnet.

11. A feeder as defined in claim 9 including a ramp between said first and second wall means, said ramp extending upwardly as it extends toward said outlet.

* * * * *